(No Model.)
S. J. COX.
CALENDAR.
No. 327,532. Patented Oct. 6, 1885.
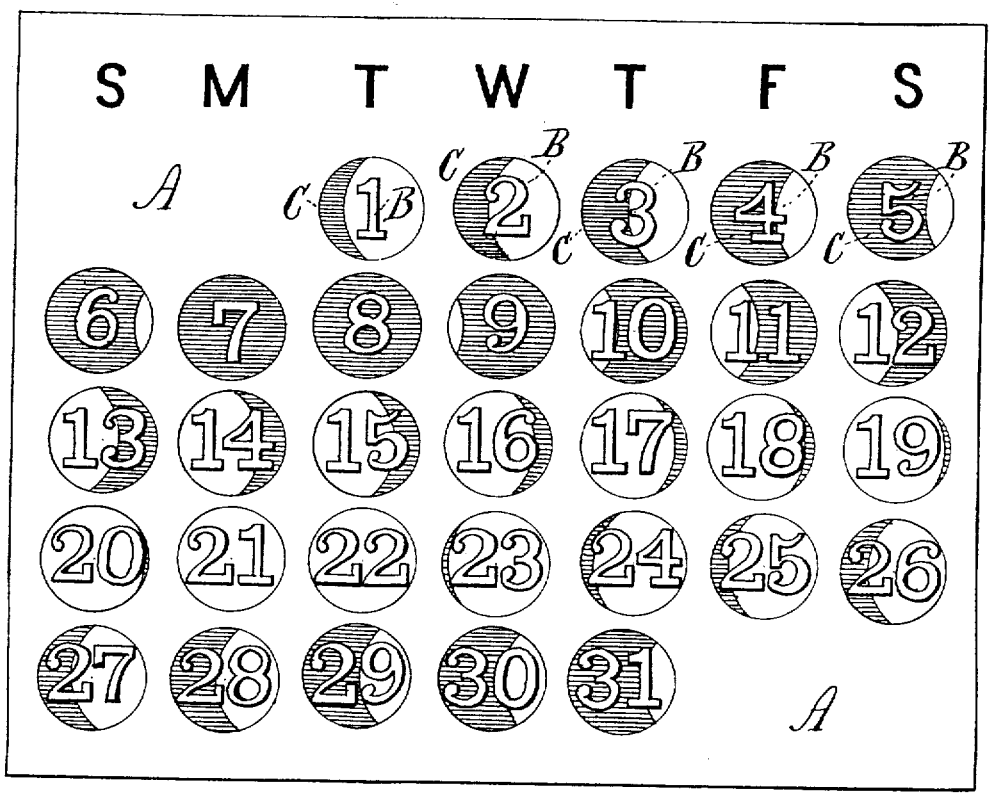
Witnesses
Allan A. Irvine
William Teed
Inventor
Stephen J. Cox
by Lewis W. Hyde Jr
Attorney

UNITED STATES PATENT OFFICE.

STEPHEN J. COX, OF NEW YORK, N. Y.

CALENDAR.

SPECIFICATION forming part of Letters Patent No. 327,532, dated October 6, 1885.

Application filed December 19, 1884. Serial No. 150,721. (No model.)

*To all whom it may concern:*

Be it known that I, STEPHEN J. COX, a citizen of the United States, and a resident of the city of New York, in the county of New York and State of New York, have invented a certain new and useful Calendar, of which the following is a specification.

The nature of my invention consists in a calendar, upon which is placed, by printing or otherwise, the dates for each day of every month of the year, and in conjunction and combination therewith a device representing the moon's phase for the particular date of each and every day, so arranged in juxtaposition with the numeral for the day as to form an integral part thereof, the object being to furnish information as to the condition of the moon at each particular date to enable all persons who may from necessity or motives of pleasure or recreation desire to avail themselves of the same, the calendar furnishing them at a glance all they may require as to a knowledge of the state of the moon.

The figure of the drawing accompanying is a face view of part of a calendar consisting of a background upon which, by printing or otherwise, are representations of the moon's phases for each and every day of one month of a year, with the numeral for each day in juxtaposition with the moon's phases for that particular date. The entire twelve months may be shown upon one page or upon separate sheets for each month, to be torn off as the month expires.

A represents the calendar. I do not confine myself to the precise shape shown, as it might be formed otherwise and of any suitable material.

B represents the numerals for each day of the month for each month of a year. They may be arranged upon the background in other form than herein shown, if desired.

C represents the illustration of the moon's phases. I form a circle giving the circumference of the moon. Upon this circle, as upon the face of the moon, I represent the particular phase, showing at a glance the condition and probabilities of light to enable persons desiring to avail themselves thereof to take advantage of that circumstance.

I have shown the numerals within the circles; but they may be placed otherwise, so long as the conditions of juxtaposition are observed.

What I claim as new, and desire to secure by Letters Patent of the United States, is—

A calendar containing the dates of each day of the month throughout the year, each figure or numeral in juxtaposition, with an illustration representing the moon's phase at each particular date, essentially as shown and described.

Signed at New York city, in the county of New York and State of New York, this 17th day of December, A. D. 1884.

STEPHEN J. COX.

Witnesses:
 GEORGE SIMCO,
 VICTOR ROSHER.